US009128781B2

(12) United States Patent
Kranich et al.

(10) Patent No.: US 9,128,781 B2
(45) Date of Patent: Sep. 8, 2015

(54) PROCESSOR WITH MEMORY RACE RECORDER TO RECORD THREAD INTERLEAVINGS IN MULTI-THREADED SOFTWARE

(71) Applicant: Intel Corporation, Santa Clara, CA (US)

(72) Inventors: Tim Kranich, Braunschweig (DE); Gilles A. Pokam, Livermore, CA (US); Justin E. Gottschlich, Fort Collins, CO (US); Klaus Danne, Braunschweig (DE); Rolf Kassa, Braunschweig (DE); Shiliang Hu, San Jose, CA (US); Cristiano L. Pereira, Groveland, CA (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 13/729,718

(22) Filed: Dec. 28, 2012

(65) Prior Publication Data
US 2014/0189256 A1  Jul. 3, 2014

(51) Int. Cl.
*G06F 9/52* (2006.01)
*G06F 11/36* (2006.01)

(52) U.S. Cl.
CPC ............... *G06F 9/526* (2013.01); *G06F 11/36* (2013.01)

(58) Field of Classification Search
CPC ........ G06F 12/0813; G06F 9/52; G06F 13/18
See application file for complete search history.

(56) References Cited

PUBLICATIONS

Xu, Min, et al., "A Hardware Memory Race Recorder for Deterministic Replay", *Published by the IEEE Computer Society*, Jan.-Feb. 2007, pp. 48-55.

*Primary Examiner* — Gurtej Bansal
(74) *Attorney, Agent, or Firm* — Vecchia Patent Agent, LLC

(57) ABSTRACT

A processor includes a first core to execute a first software thread, a second core to execute a second software thread, and shared memory access monitoring and recording logic. The logic includes memory access monitor logic to monitor accesses to memory by the first thread, record memory addresses of the monitored accesses, and detect data races involving the recorded memory addresses with other threads. The logic includes chunk generation logic is to generate chunks to represent committed execution of the first thread. Each of the chunks is to include a number of instructions of the first thread executed and committed and a time stamp. The chunk generation logic is to stop generation of a current chunk in response to detection of a data race by the memory access monitor logic. A chunk buffer is to temporarily store chunks until the chunks are transferred out of the processor.

25 Claims, 13 Drawing Sheets

CHUNK 415

| REASON FOR CHUNK TERMINATION (OPTIONAL) 440 | NUMBER OF COMMITTED MACRO INSTRUCTIONS 441 | TIME STAMP 442 | NUMBER OF MEMORY ACCESSES (OPTIONAL) 443 | NUMBER OF OUTSTANDING WRITES (OPTIONAL) 444 |

FIG. 4

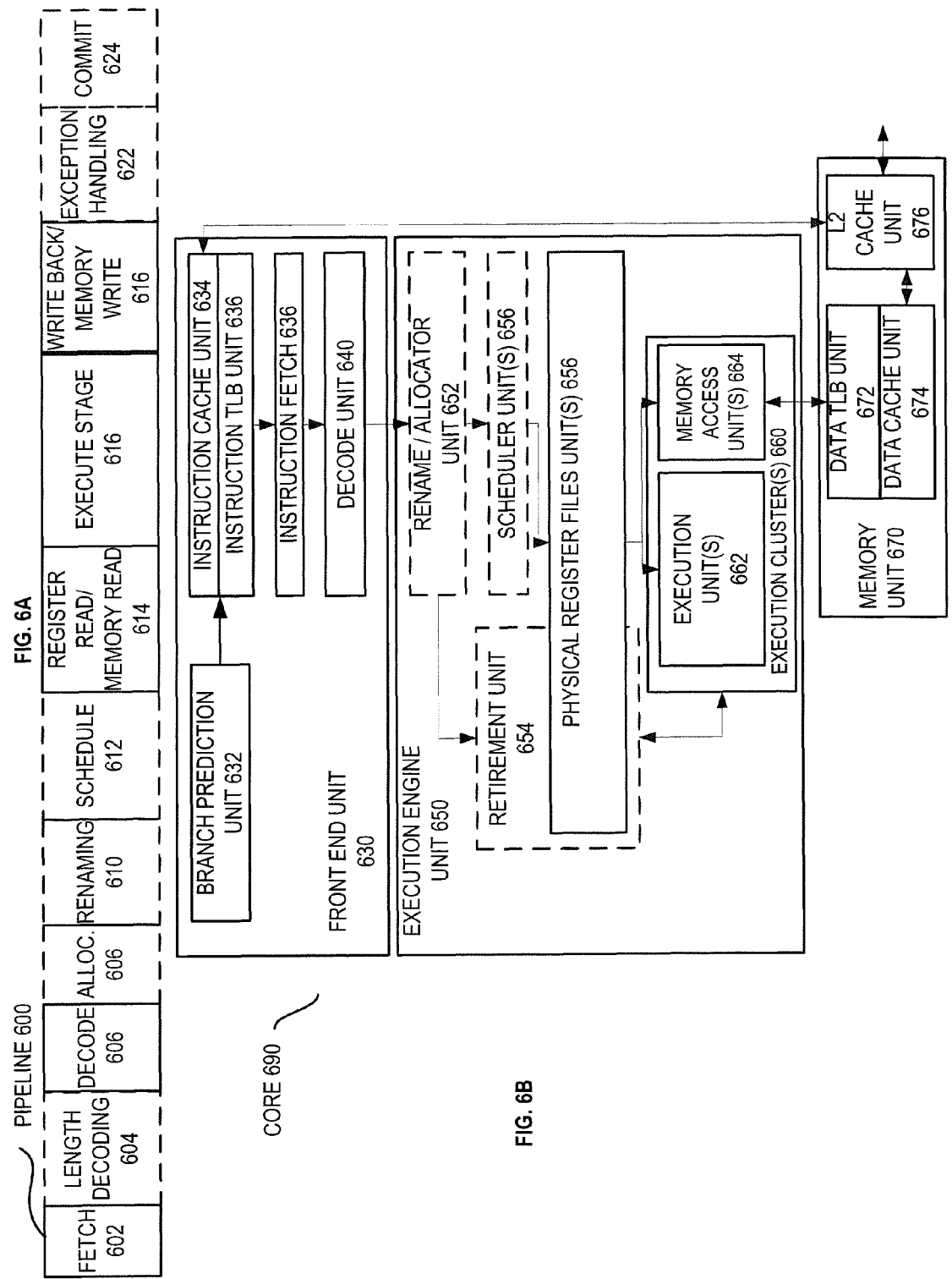

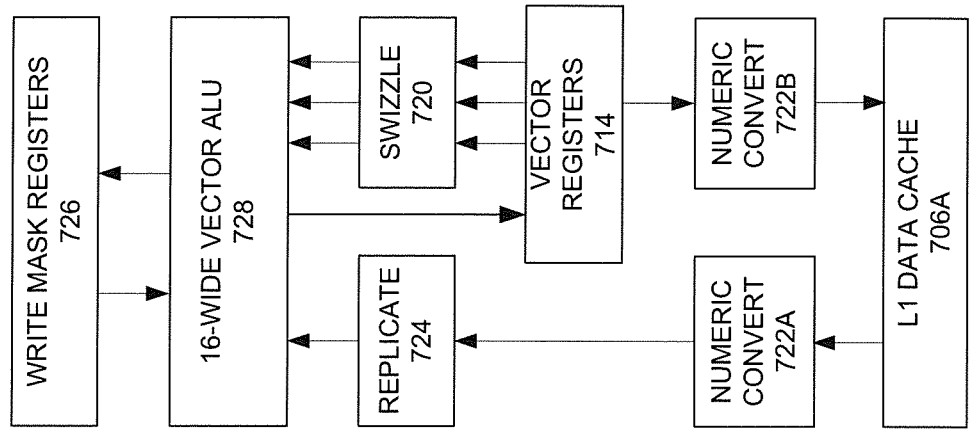
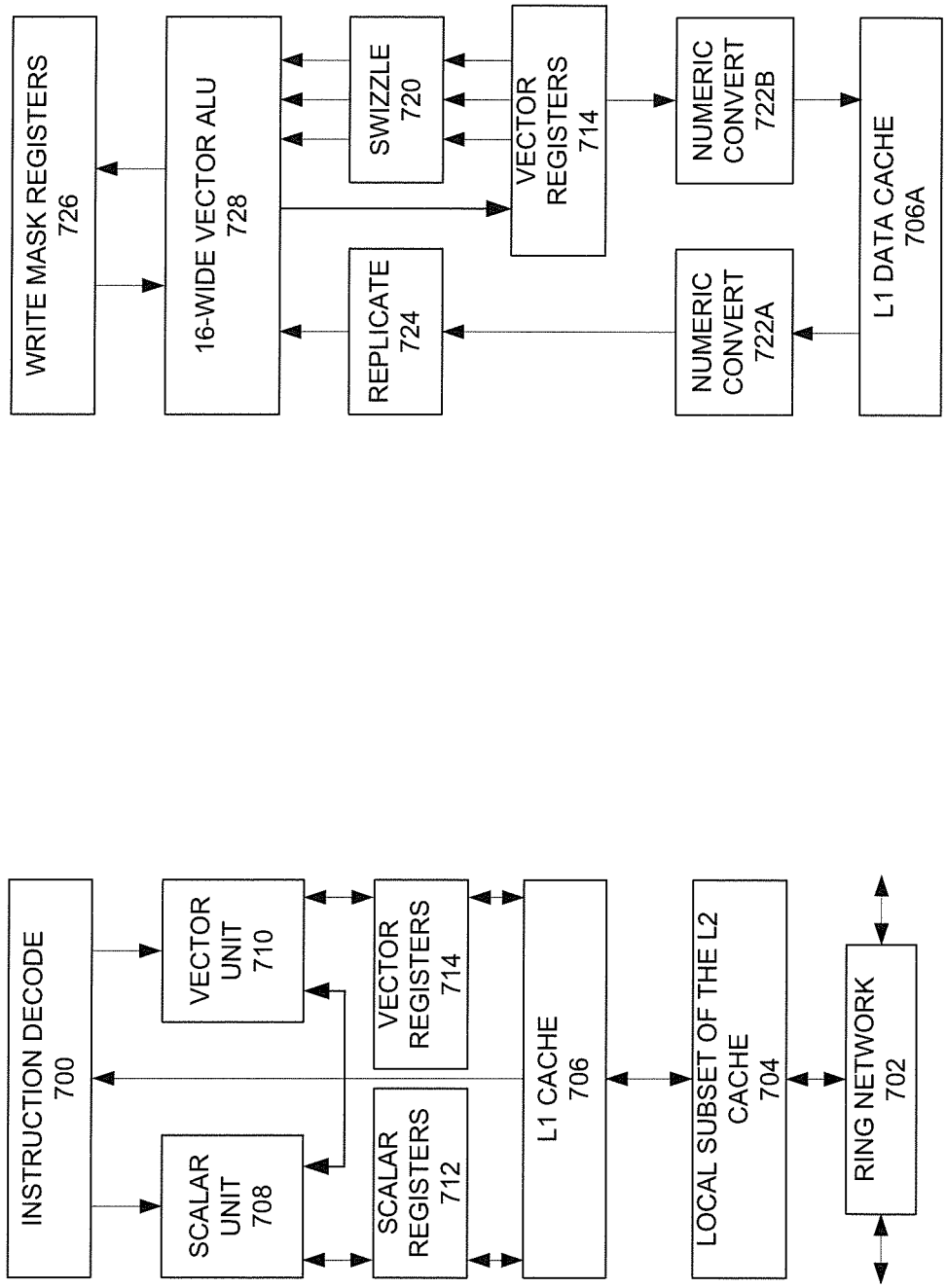

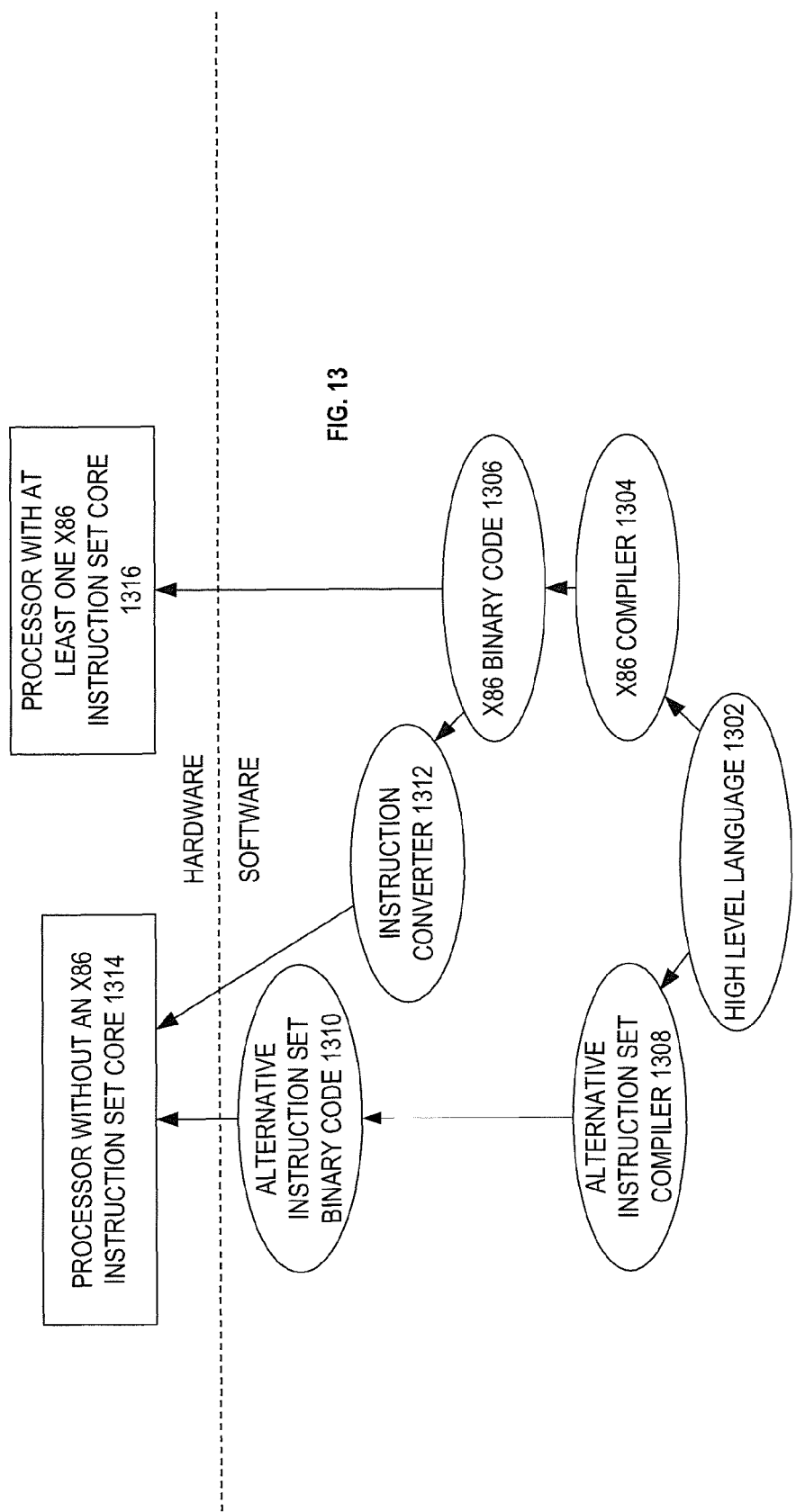

PROCESSOR WITH MEMORY RACE RECORDER TO RECORD THREAD INTERLEAVINGS IN MULTI-THREADED SOFTWARE

BACKGROUND

1. Field

Embodiments relate to the field of processors. In particular, embodiments relate to the field of multi-threaded processors.

2. Background Information

Multi-threaded and/or multi-core processors are commonplace today. They are used in various types of computing devices such as servers, desktops, laptops, netbooks, tablets, smartphones, and cell phones, to name just a few examples. It is currently expected that, at least for some processor segments, the trend to increasingly more threads and/or cores is going to continue into the future.

The multiple threads and/or cores generally help to improve performance by providing hardware parallelism which allows more instructions to be executed concurrently or in parallel. The multiple threads and/or cores have encouraged the development of multi-threaded or parallel processing software. For example, a multi-threaded application may include multiple threads that execute concurrently on different hardware threads and/or cores. In addition, stand-alone applications are often extended with plugins that open gateways to various services that provide even more software parallelism.

However, one challenge with such multi-threaded or parallel processing software is that it tends to be more difficult to debug as compared to single-threaded software. One factor in particular that contributes to the difficulty in debugging such software is the non-deterministic nature of the execution of such software. For example, the threads of a multi-threaded program may interleave differently from one execution of the program to the next. Such variance in the interleaving of the threads may cause variance into the ordering of the accesses by the threads to shared memory from one execution of the program to the next. For example, the threads may access the shared memory in one particular interleaved order one time the program is executed, but the threads may access the shared memory in a different interleaved order another time the program is executed.

Some types of bugs in particular may be difficult to analyze, debug, and fix, as a result of such non-deterministic execution behavior. For example, concurrency bugs may only occur under some but not all thread interleavings and/or shared memory access orderings. For example, a concurrency bug may occur one time a program is executed with a particular thread interleaving (and/or shared memory access ordering), but the concurrency bug may not occur another time the program is executed with a different thread interleaving (and/or different shared memory access ordering). This may tend to make it difficult for a software developer, software debugger, or the like, to know, let alone reproduce, the particular thread interleaving and/or shared memory access ordering that resulted in the concurrency bug.

For these reasons, it may tend to take more time to debug multi-threaded or parallel processing software as compared to single-threaded software. This may tend to lead to higher software development costs and/or potential delays in bringing the multi-threaded or parallel processing software to market. Because of such factors, some software developers tend to favor single-threaded software (e.g., where concurrency bugs are easier to debug) over multi-threaded software. However, without multi-threaded or parallel processing software the hardware parallelism of the multi-thread and/or multi-cores cannot be fully exploited to its full potential.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 4 is a block diagram of an embodiment of a chunk.

FIG. 6A is a block diagram illustrating both an exemplary in-order pipeline and an exemplary register renaming, out-of-order issue/execution pipeline according to embodiments of the invention.

FIG. 6B is a block diagram illustrating both an exemplary embodiment of an in-order architecture core and an exemplary register renaming, out-of-order issue/execution architecture core to be included in a processor according to embodiments of the invention.

FIG. 7A is a block diagram of a single processor core, along with its connection to the on-die interconnect network and with its local subset of the Level 2 (L2) cache, according to embodiments of the invention.

FIG. 7B is an expanded view of part of the processor core in FIG. 7A according to embodiments of the invention.

FIG. 13 is a block diagram contrasting the use of a software instruction converter to convert binary instructions in a source instruction set to binary instructions in a target instruction set according to embodiments of the invention.

DETAILED DESCRIPTION

Disclosed herein are processors with memory race recorder logic to record thread interleaving and/or shared memory access patterns during the execution of multi-threaded software. In the following description, numerous specific details are set forth (e.g., specific memory race recorder logic, chunks (e.g., contents and formats of chunks), microarchitectural details, logic partitioning/integration details, sequences of operations, types and interrelationships of system components, formats, and the like). However, it is understood that embodiments of the invention may be practiced without these specific details. In other instances, well-known circuits, structures and techniques have not been shown in detail in order not to obscure the understanding of this description.

Figure 1:
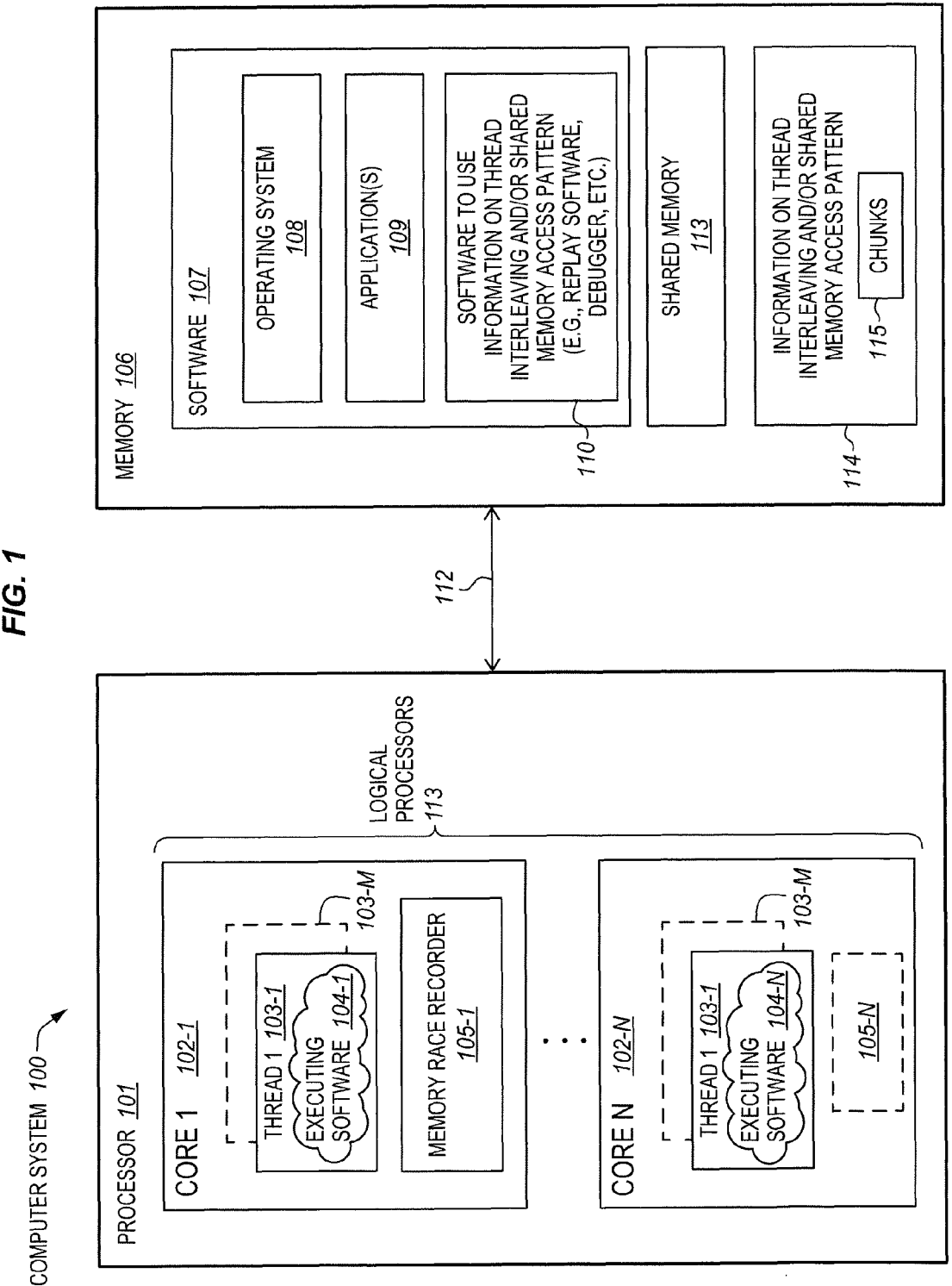
FIG. 1 is a block diagram of a computer system including an embodiment of a processor.

FIG. 1 is a block diagram of a computer system 100 including an embodiment of a processor 101 and a memory 106. The processor and the memory are coupled, or otherwise in communication with one another, by a conventional coupling mechanism 112 (e.g., through one or more buses, hubs, memory controllers, chipset components, or the like). The memory may include one or more memory devices and/or one or more different types of memory.

In some embodiments, the processor 101 may be a general-purpose processor (e.g., of the type used in desktop, laptop, netbook, tablet, smartphone, cell phone, server, and like computer systems). Alternatively, the processor may be a special-purpose processor. Examples of suitable special-purpose processors include, but are not limited to, communications processors, network processors, cryptographic processors, graphics processors, co-processors, embedded processors, digital signal processors (DSPs), and controllers (e.g., microcontrollers), to name just a few examples.

The processor includes a plurality of logical processors 113. The logical processors may also be referred to as processing elements and they typically include on-die processor hardware potentially combined with firmware and/or software. Although embodiments may be used for any number of logical processors (e.g., including a single logical processor), commonly the greatest benefit may be experienced when there are multiple or many such logical processors. The more logical processors generally the greater the potential for different thread interleaving combinations to occur from one execution to the next, which without the embodiments disclosed herein, may tend to make debugging more complicated.

Each of the logical processors may represent on-die hardware and/or logic to support a software thread (e.g., operating system code, application code, software tasks, software processes, etc.) and/or be independently associated with a software thread. Examples of suitable logical processors include, but are not limited to, cores, hardware threads, thread units, thread slots, process units, contexts, context units, and/or any other logic that is capable of holding state (e.g., an execution state and/or an architectural state) and being independently associated with code (e.g., a software thread).

In the illustrated embodiment, the logical processors are implemented through a first core 1 102-1 through an Nth core N 102-N, where N may be any desired number. Typically, the number N ranges from two to many hundreds, often ranging from two to on the order of tens. The cores may be homogeneous or heterogeneous (e.g., have homogeneous or heterogeneous instruction sets, homogeneous or heterogeneous hardware resources, some be special-purpose cores while others general-purpose cores, etc.). Each core has at least one hardware thread 103. For example, in the illustrated embodiment, the core 1 may have a first thread 1 103-1 through an Mth thread 103-M. Similarly, the core N may have a first thread 1 103-1 through an Mth thread 103-M. The number M may be any desired number and may be different on different cores. Typically, the number M ranges from one to several (e.g., often less than about ten), although the scope of the invention is not so limited.

The term core often refers to logic located on an integrated circuit that is capable of maintaining an independent architectural state (e.g., an execution state), in which the independently maintained architectural state is associated with dedicated execution resources. In contrast, the term hardware thread often refers to logic located on an integrated circuit that is capable of maintaining an independent architectural state, in which the independently maintained architectural state shares access to the execution resources it uses. When certain resources are shared by an architectural state, and others are dedicated to the architectural state, the line between a core and a hardware thread is less distinct. Nevertheless, software entities, such as an operating system, commonly view different cores and/or different hardware threads as separate logical processors, which are capable of executing different software threads concurrently. The operating system is generally able to individually schedule threads or software processes on each of the cores, hardware threads, or other logical processors.

Referring again to FIG. 1, the memory 106 includes software 107. In the illustrated embodiment, the software includes an operating system 108 and one or more applications 109. During operation, a portion of the software may execute on the processor as executing software 104. For example, the thread 1 103-1 on the core 1 may have first executing software 104-1 and the thread 1 103-1 on the core N may have Nth executing software 104-N. Examples of the executing software include, but are not limited to, software threads, tasks, processes, etc.

The executing software may include macroinstructions or instruction set architecture (ISA) level instructions that are loaded from the software 107 and executed on the processor (e.g., scheduled, decoded, executed, etc.). Typically, such instructions include one or more types of memory access instructions. Examples of such memory access instructions include, but are not limited to, loads, stores, writes, reads, gathers, scatters, other instructions that combine loads and stores, and the like. Still other instructions may fence memory access instructions (e.g., load fence instructions, store fence instructions, memory fence instructions, etc.) in order to help serialize the memory accesses. Such instructions may access, or serialize accesses to, a shared memory 113. The shared memory may represent one or more portions of the memory 106 that is shared by at least two of the logical processors.

Referring again to FIG. 1, the processor also includes an embodiment of memory race recorder logic 105. The memory race recorder logic represents an embodiment of shared memory access monitoring and recording logic. The memory race recorder logic may be operable to generate and log, record, or otherwise store information 114 about thread interleaving and/or shared memory access pattern/ordering of some or all of the executing software on the processor. The memory race recorder logic may be operable to trace thread interleaving and/or shared memory accesses by multiple threads. In one aspect, this information may represent memory race recorder data. In some embodiments, this information may be stored in the memory 106 by the memory race recorder logic. In some embodiment, this information may include chunks 115 (e.g., packets or other data structures). In some embodiments, chunks from different software threads and/or logical processors may be stored in different portions (e.g., predefined memory address regions) of the memory, although this is not required. In other embodiments, in addition to and/or instead of storing this information in the memory, this information may be output on pins of the processor.

In some embodiments, the memory race recorder logic 105 is on-die and/or on-processor. The on-die/processor logic is fixed, resident, or persistent on-die/processor (e.g., as opposed to software instructions that are loaded into the processor from the memory). Commonly, the on-die/processor logic is present on the die/processor even when the processor is powered off, prior to booting, and/or at the time of completion of manufacture. In some embodiments, the on-die/processor logic includes a combination of hardware (e.g., integrated circuitry, transistors, registers, etc.), firmware (e.g., microcode), and/or other on-die/processor logic. The firmware may include a combination of persistent and/or non-volatile memory of the processor (e.g., read only memory (ROM), electrically programmable ROM (EPROM), flash memory, or the like.) and instructions (e.g., microcode, microinstructions, microarchitectural instructions, circuit level instructions that are lower-level than ISA instructions, or the like) stored in the persistent and/or non-volatile memory.

The information about the thread interleaving and/or shared memory access pattern may be used for various different purposes. The scope of the invention is not limited to any known such purpose. Examples of possible uses include, but are not limited to, debugging (e.g., software debug and/or hardware debug), post silicon validation, program analysis, diagnostic purposes, performance analysis and tuning, other uses of replaying particular thread interleaving deterministically, other uses of reproducing particular memory access patterns deterministically, and the like. The information may be used both during software/hardware development and after release of the software/hardware.

In some cases, the software 107 may include software 110 that is to use the information 114 on the thread interleaving and/or shared memory access pattern. Examples of such software include, but are not limited to, a replay tool, replay software, a debugger, performance tuning software, and the like. By way of example, in the case of debugging, a practitioner (e.g., a software developer) may use replay software to access the information 114 and use it to replay a particular interleaving of threads deterministically to achieve a particular corresponding shared memory access pattern deterministically in order to cause a bug (e.g., a concurrency bug) to occur. Advantageously, the information 114 may allow the particular interleaving of threads, having a particular corresponding shared memory access pattern, to be replayed precisely in the way they occurred in a prior execution when the concurrency bug was earlier observed, for example. The practitioner may also use debugging software to analyze and fix the bug. In some embodiments, the information 114 may also be combined with other conventional instruction trace information (e.g., real time instruction trace data) to further enhance the replay and/or debugging, although the scope of the invention is not limited in this regard.

Figure 2:
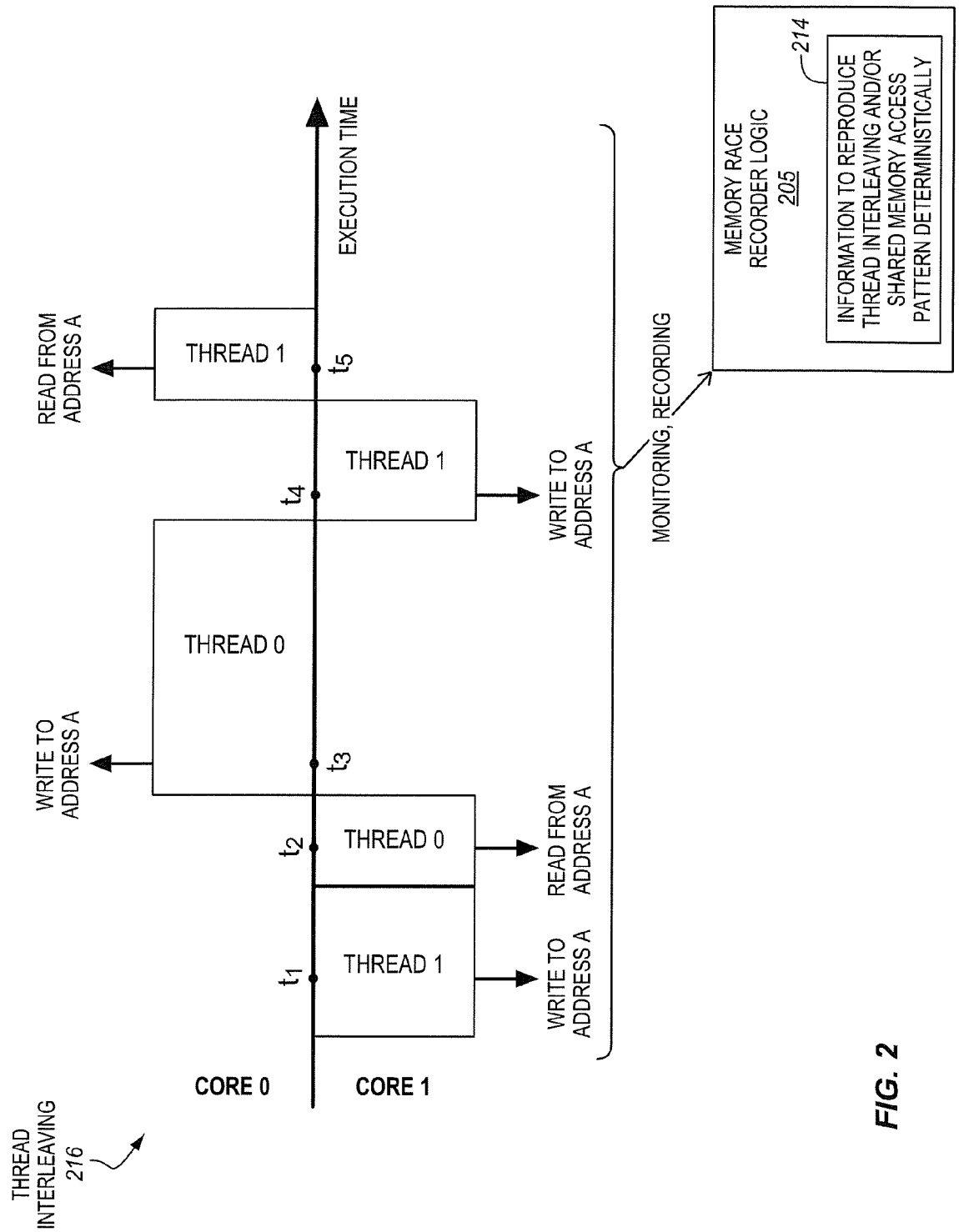
FIG. 2 illustrates thread interleaving and an embodiment of a memory race recorder monitoring the thread interleaving.

FIG. 2 illustrates thread interleaving 216 and an embodiment of a memory race recorder 205 monitoring the thread interleaving. The thread interleaving is illustrated by a plot over time of the execution of different threads on different cores. In the illustration, the execution occurs on two cores, namely core 0 and core 1, which are each dual-threaded cores. Each dual-threaded core executes a software thread 0 and a software thread 1. Increasing execution time is plotted from left to right.

At time t1, thread 1 on core 1 writes to a shared memory address A. At time t2, thread 0 on core 1 reads from the shared memory address A. At time t3, thread 0 on core 0 writes to the shared memory address A. At time t4, thread 1 on core 1 writes to the shared memory address A. At time t5, thread 1 on core 0 reads from the shared memory address A. This example shows thread interleaving and how the thread interleaving can result in a pattern over time of multiple threads accessing (e.g., reading from and writing to) the shared memory address (e.g., the write from thread 1 on core 1, then the read from thread 0 on core 1, then the write from thread 0 on core 0, and so on).

As mentioned above, such thread interleaving is often non-deterministic. As a result, the shared memory access pattern is also non-deterministic. For example, in another execution, the write to the shared address A shown at time t3 may occur prior to the read from address A shown at time t2. The embodiment of the memory race recorder 205 is operable to monitor the execution of the threads, including the thread interleaving, and the pattern of the accesses to the shared memory address. The memory race recorder is operable to log, record, or otherwise store information 214 that is sufficient to allow the particular observed thread interleaving and/or shared memory access pattern to be specified and/or deterministically reproduced (e.g., replayed). The memory race recorder logic represents an embodiment of shared memory access monitoring and recording logic.

Figure 3:
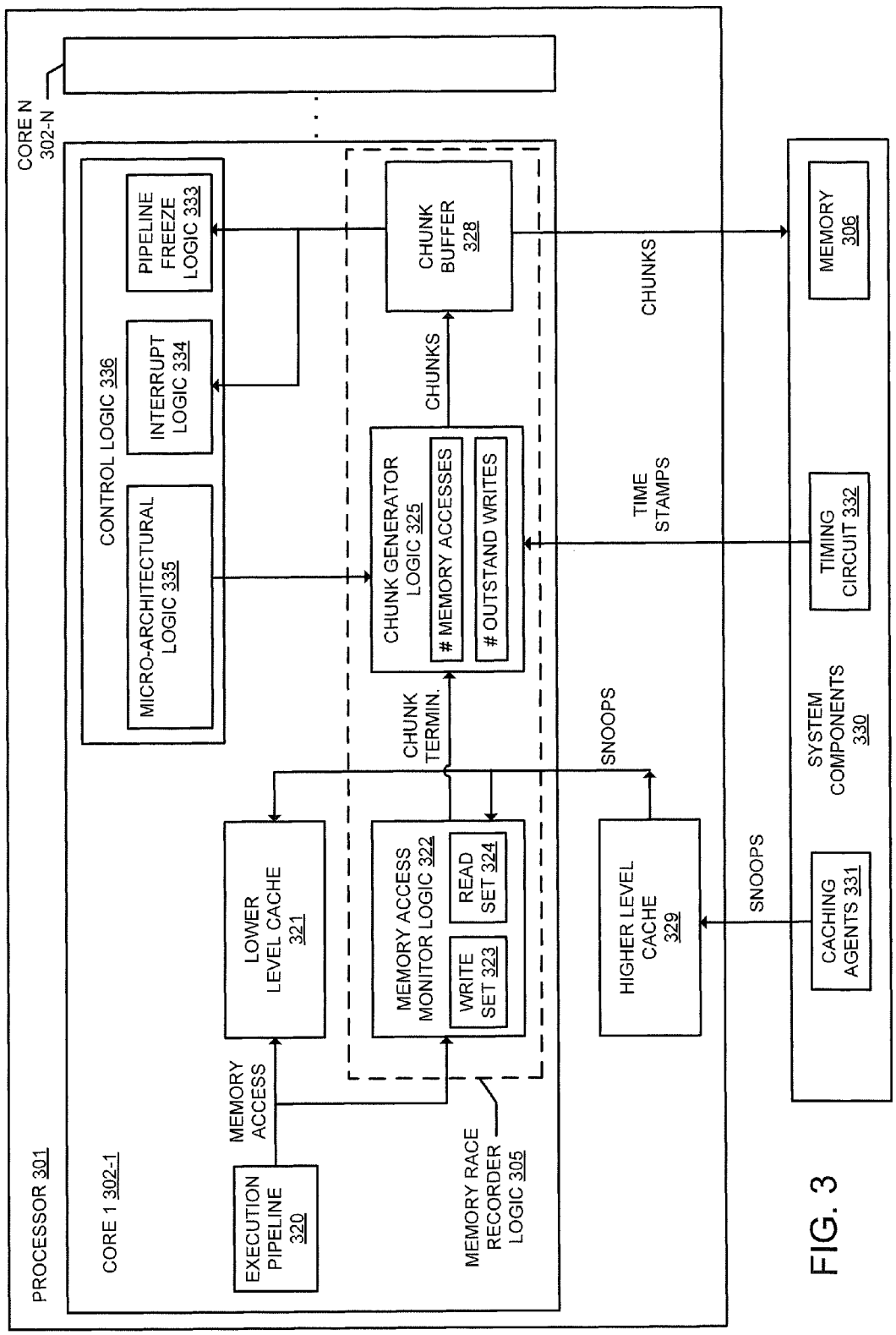
FIG. 3 is a block diagram of a processor having an embodiment of memory race recorder logic.

FIG. 3 is a block diagram of a processor 301 having an embodiment of memory race recorder logic 305. In some embodiments, the processor and/or the memory race recorder logic of FIG. 3 may be included in the system of FIG. 1. Alternatively, the processor and/or the memory race recorder logic of FIG. 3 may be included in a similar or different system. Moreover, the system of FIG. 1 may include either the same, similar, or different processor and/or memory race recorder logic than those of FIG. 3.

The processor includes a core 1 302-1 through a core N 302-N. These may be as previously described (e.g., homogeneous or heterogeneous, single-threaded or multi-threaded, etc.). The core 1 includes the embodiment of the memory race recorder logic 305. In one embodiment, some or all of the other cores may also include such memory race recorder logic. Including memory race recorder logic in all of the cores, or at least all of the cores accessing a shared memory, may have an advantage of being able to capture all cross-thread memory dependencies, although this is not required.

In some embodiments, the memory race recorder logic 305 may be operable to generate information sufficient to represent an interleaving of threads and/or a shared memory access pattern of threads. The memory race recorder logic represents an embodiment of shared memory access monitoring and recording logic. The memory race recorder logic may be implemented in hardware (e.g., integrated circuitry, transistors, etc.), firmware (e.g., instructions stored on non-volatile memory), software, or a combination thereof. In some embodiments, the memory race recorder logic may be implemented predominantly or almost completely in hardware, potentially combined with one or more of firmware and software. In some embodiments, the memory race recorder logic may support always-on memory race recording, although this is not required. Memory race recording may also be done through a simulation or software based approach, although this generally significantly reduced performance (e.g., is intrusive), and additionally such a software-based approach may not expose all of the features of a hardware solution (e.g., outstanding writes to a store buffer may not be exposed, etc.).

The memory race recorder logic includes memory access monitor logic 322. The memory access monitor logic may be operable to monitor accesses to system memory by instructions executing in an execution pipeline 320. For example, these memory accesses may occur as a result of execution of load, store, gather, scatter, and/or other types of memory access instructions, depending upon the particular instruction set of the core. The memory access monitor logic may be operable to monitor and log local read and write memory operations. For example, the memory access monitor logic may include read access monitor logic to monitor and log read-type memory accesses in a read set structure 323, and write access monitor logic to monitor and log write-type memory accesses in a write set structure 324. By way of example, each time a read or write operation is performed, the corresponding cache line address may be added to the read or write set structures, respectively. In some embodiments, Bloom filters may be used to implement the read and write set structures. Bloom filters are an example of space-efficient probabilistic structures that are used to compactly represent a set of addresses with a hash of the addresses and test whether an element is a member of a set. Alternatively, substitutes for Bloom filters known in the arts may be used. In still other embodiments, the read and write set structures may be implemented through one or more bits in the lower level cache 321 that are sufficient to log the accesses. Alternatively, other mechanisms to track and log this type of information may be used instead.

If a memory location is shared, and another logical processor wants to access the shared memory location, then it may snoop the owner of the shared memory location. As shown in the illustration, snoops from caching agents 331 in the system may be directed to a higher level shared cache 329, and then to a lower level cache 321 of the core 1 302-1. The higher level shared cache may be shared by the core 1 and other cores. The snoops may also be provided to the memory access monitor logic 322, as shown by the arrow connecting the snoop output from the higher level cache to the memory access monitor logic. The snoops provided to the memory access monitor logic may trigger address comparisons by address comparison logic of the memory access monitor. For example, the addresses corresponding to the snoops may be compared to the read set and/or the write set (e.g., to hashes).

If the addresses corresponding to the snoops exist in at least one of the read and write sets, then this may indicate that the addresses were also used by the logical processor or thread before, and this may indicate a data dependency. In some embodiments, if the data dependency is of the type read-after-write, write-after-read or write-after-write, then this may be indicative of a memory race or data race. The memory race or data race may represent a concurrent access to the same memory location or data by multiple threads or logical processors. In such cases, the generation of the current chunk may be terminated or stopped. As shown, the memory access monitor logic may provide a chunk termination signal to chunk generator logic 325. Other types of data dependencies, unless they indicate a data race, may not need to terminate the generation of the current chunk. In embodiments that use a Bloom filter, the comparison may potentially provide a false positive, since the hashes of two different addresses may potentially be equal. Such false positives may induce chunk termination add additional unnecessary thread synchronization but should maintain thread interleaving correctness. In some embodiments, the read and write set structures may be flushed after each chunk termination.

Referring again to FIG. 2, the memory race recorder logic also includes chunk generator logic 325. The chunk generator logic is operable to generate chunks that include information to indicate the interleaving of threads and/or the shared memory access pattern. The term chunk is to be interpreted broadly herein to represent a packet or other data structure. In some embodiments, the execution of software is divided or segmented into these chunks. In some embodiments, each chunk may represent the set of dynamic instructions that have been executed by the corresponding thread being monitored since the previous chunk termination. As mentioned above, in some embodiments, the generation of a chunk may terminate when a remote memory reference races with at least one of the memory addresses accessed locally by the monitored thread. In some embodiments, each chunk may indicate the number of macro-instructions or ISA level instructions executed within the confines of the chunk (e.g., since the last memory race).

In some embodiments, each chunk may include time information (e.g., a time stamp) sufficient to allow the chunks to be ordered or serialized relative to one another in order to represent the actual observed thread interleaving. As shown in the illustration, the chunk generator logic may receive time stamps or other timing information, for example from timing circuits 332 or other system components. The time information in each chunk may allow sorting the different chunks across all threads. The sequence of sorted chunks from each thread may be used, for example by replayer software or another tool, in order to reconstruct the exact same memory interleaving.

Different ways of including the time stamps or other time information are contemplated. In some embodiments, a full absolute time stamp may be included in each chunk. For example, the absolute time stamp may represent the official processor wall clock timer value, which in some processors may be an architectural feature, and may potentially be synchronized on multi-core and even multi-socket systems sharing the same reset signal. However, often a relatively large number of bits may be needed in order to represent such an absolute time stamp. As a result, including the absolute time stamp in each chunk may tend to increase the amount of memory or storage needed to store all of the chunks.

In other embodiments, an absolute time stamp may be transmitted periodically (e.g., at fixed times, fixed time intervals, every certain number of chunks, or the like), and chunks may include differential time information (e.g., a differential time stamp). The differential time stamps may be encoded in fewer bits than the absolute time stamp. For example, in one embodiment, an absolute time stamp may be transmitted, then the first chunk after the absolute time stamp may include a differential time stamp that is relative to the absolute time stamp, then next chunk may include a differential time stamp that is relative to the differential time stamp of the first chunk, and so on. An advantage of such an approach is that it allows the timing information to be encoded in a lesser number of bits than needed when each chunk has an absolute time stamp. This may help to reduce the amount of memory or storage needed to store the chunks, the bus bandwidth need to convey the chunks to memory, etc.

As mentioned above, a data race is one possible reason to terminate the generation of the current chunk. There are various other possible reasons depending upon the particular implementation. In some embodiments, threads may be monitored on a per-process basis. For example, a practitioner (e.g., a software developer) may specify to selectively monitor a given software process. In such embodiments, the memory race recorder logic may resume and terminate chunk generation, respectively, on context switches to and from the monitored process. In some embodiments, the memory race recorder may be operable to isolate user mode programs and their memory accesses from other mode accesses (e.g., operating system or other privileged software, etc.). This may allow memory race recording of specific user-level programs.

In some embodiments, threads may be monitored based on their current privilege level. For example, user-level applications may have one privilege level, operating system code may have another privilege level, virtual machine monitor code may have yet another privilege level, etc. In some processors such privilege level is represented by a ring level. By way of example, a practitioner may specify the current privilege level for the memory race recorder logic to monitor (e.g., by writing to a configuration register). In such embodiments, the memory race recorder logic may resume and terminate chunk generation, respectively, when execution transitions to and from the configured current privilege level to be monitored. Examples of events that may cause a current privilege level change include, but are not limited to, interrupts, exceptions, attempted illegal activities, and the like. Advantageously, in one aspect, this may allow isolating user-mode programs and their memory accesses from operating system or kernel-mode accesses so that memory race recording may be used to specifically analyze user-level programs.

There are various other possible reasons for the memory race recorder logic to terminate the generation of the current chunk. In some embodiments, such termination may occur when the processor accesses an un-cacheable memory region. In some embodiments, such termination may occur in response to translation lookaside buffer (TLB) invalidations. In some embodiments, such termination may occur in response to a privileged instruction indicating (e.g., having an opcode indicating) that termination of the generation of the current chunk is to be terminated. Some embodiments pertain to such a privileged instruction that is operable in response to being decoded and/or when executed to terminate the generation of the current chunk, and to processors to execute the instruction, methods performed by processors when executing the instruction, and the like. In some embodiments, such termination may occur in the event of a memory race recorder logic counter overflowing, or some other internal event within the memory race recorder logic.

FIG. 4 is a block diagram of an embodiment of a chunk 415. In some embodiments, the chunk of FIG. 4 may be generated and processed by the processor and/or system of FIG. 1 and/or the processor of FIG. 3. Alternatively, the processor and/or system of FIG. 1 and/or the processor of FIG. 3 may generate and process similar or entirely different chunks.

In some embodiments, the chunk optionally includes a reason for chunk termination 440. The reason for chunk termination may be a code, for example, that indicates any of the various reasons for chunk termination mentioned above. Examples of such reasons include, but are not limited to, a data race, on context switches from a configured process to be monitored, when execution transitions from a configured privilege level to be monitored, when the processor accesses an un-cacheable memory region, in response to TLB invalidations, other reasons mentioned, and the like. The reason for chunk termination may provide additional information useful for understanding the thread interleaving, which may be useful for debugging or analyzing program behavior, but is not required.

The chunk also includes a number 441 of retired or otherwise committed macro instructions or ISA level instructions within the confines of the chunk (e.g., since the last chunk termination). This may allow determination of where the program is at (e.g., by counting instructions).

The chunk also includes a time stamp 442. In some embodiments, the time stamp may be a global time stamp. In other embodiments, the time stamp may be a differential time stamp. A combination of global and differential time stamps may also be used. The time stamps may be used to order chunks sequentially in time.

In some embodiments, the chunk optionally includes a number 443 of memory accesses that have been performed by a macroinstruction that is at an intermediate stage of completion when the chunk generation terminates. Some macro instructions, such as, for example, vector gather instructions and vector scatter instructions, read and write instructions, write and read instructions, or other instructions often found in CISC processors, have multiple memory accesses. By way of example, a sequence of microinstructions or other operations may be performed in response to the macroinstruction. The current chunk generation may potentially terminate when the macroinstruction is at an intermediate stage of completion prior to all of the microinstructions or operations completing. This may represent an instruction atomic violation. The chunk generation terminates within a macroinstruction not between macroinstruction level boundaries. In some embodiments, the number 443 of memory accesses performed may help to record such information (e.g., by recording an incomplete subset of memory accesses of a single macroinstruction). In other embodiments, the number of memory accesses not yet performed may be recorded. In some embodiments, the chunk generator may include logic operable to monitor the set of memory accesses within a macroinstruction and record the subset that are or are not completed when chunk generation terminates. Accordingly, in some embodiments, the memory race recorder logic may be operable to perform memory race recording in a CISC ISA processor for multiple memory access macroinstructions within the multiple microinstructions or other operations of the single macroinstruction. In still other embodiments, this may optionally be omitted, for example when the ISA doesn't include such multi-access macroinstructions, when the information is not desired for the particular implementation, etc.

In some embodiments, the chunk optionally includes a number 444 of outstanding writes (e.g., to a store buffer). In some processors, retired stores in the store buffer may not yet be globally visible. As a result, other logical processors or threads may not be able to get the data from the outstanding writes. This may potentially lead to sequential consistency violations that in turn may lead to erroneous chunk and/or thread interleaving. In some embodiments, the chunk generator may include logic operable to monitor the number of outstanding writes to the store buffer when chunk generation terminates and record this information in the chunks. Further details of suitable approaches for embodiments for handling such outstanding writes, if desired, are described in co-pending application PCT/US2012/031276, filed Mar. 29, 2012, which is assigned to the Assignee of the present application.

To further illustrate certain concepts, consider how replayer software may use chunks to deterministically replay a particular thread interleaving and memory access pattern. The replayer software may select the next sequential chunk using the time stamps specified by the chunks. The replayer software may then execute and commit the number of macroinstructions specified by the selected chunk. If a number of memory accesses is specified the replayer software may allow the macroinstruction to complete the specified number of memory accesses. The replayer software may also allow the number of outstanding writes to be performed. Then, the replayer software may select the sequential next chunk, which may indicate the next thread to execute, and so on.

This is just one illustrative example embodiment of a suitable chunk. Those skilled in the art, and having the benefit of the present disclosure, will appreciate that other types of information may be included in a chunk in order to represent the thread interleaving and/or shared memory access pattern and allow them to be deterministically replayed. Alternate embodiments may include a subset of the information (e.g., omitting one or more of the optional information), may add additional information or fields, or a combination thereof. Moreover, the illustrated order/arrangement of the information is not required, but rather the information may be rearranged variously.

Referring again to FIG. 3, in some embodiments, the chunk generator logic 325 may be coupled with microarchitectural logic 335 (e.g., microcode) of control logic 336. The chunk generator logic may receive signals indicative of microarchitectural events from the microarchitectural logic. In some embodiments, the microarchitectural events may include those that may be used in the generation of chunks and/or to provision the chunks with the information to capture thread interleaving and memory access patterns. For example, in some embodiments, the microarchitectural events may include microarchitectural events related to a number of performed memory accesses by a multiple memory access macroinstruction (e.g., indications of which have or have not been performed). As another example, in some embodiments, the microarchitectural events may include microarchitectural events related to a number of outstanding writes in a store buffer.

In some embodiments, the microarchitectural events may include those that are operable to cause the chunk generator to terminate generating a current chunk. For example, in some embodiments, the microarchitectural events may indicate current privilege level changes. As another example, in some embodiments, the microarchitectural events may indicate process or thread switches. As yet another example, the microarchitectural events may be related to interrupts. As a still further example, the microarchitectural events may be related to hardware exceptions.

The chunk generator logic 325 is coupled with a chunk buffer 328. The chunk generator logic may provide generated chunks to the chunk buffer. The chunk buffer may be operable to temporarily store or buffer the chunks. In one aspect, the chunk buffer may include a first-in first-out (FIFO) buffer. The chunks may be transmitted to a memory 306 over one or more busses. In other embodiments, the chunks may additionally or alternatively be provided on processor pins instead of or in addition to the chunk memories.

In some embodiments, the chunks for each monitored process, thread, or logical processor, may be stored in a different portion of the memory, such as, for example, a different predetermined memory address range. These may be referred to herein as chunk memories. These different chunk memories may corresponding to and identify the processes, threads, or logical processors. The chunk memories may be switched, for example by software, upon each task switch, for example, by modifying a value of a configuration register. In some embodiments, logic of the processor (e.g., hardware, firmware, software, or a combination) may transfer the chunks to the memory. Alternatively, software (e.g., a kernel) may transfer the chunks to the memory. For example, logic of the chunk buffer may autonomously and gradually transfer the chunks to memory substantially without software involvement while a thread is running, and software may drain the contents of the chunk buffer to the chunk memory on a context switch. In some embodiments, the contents of the chunk buffer may be transferred in bulk to the chunk memory in response to a single macroinstruction being decoded and executed.

Advantageously, the chunk buffer may allow the chunks to be stored or buffered temporarily so that the chunks do not need to be transmitted to memory continuously as they are generated. Rather, in some embodiments, the chunks may be transferred at opportunistic times. For example, the traffic on one or more busses coupling the processor with the memory and/or the activity of these busses may be monitored. The chunk buffer may have associated arbiter logic to couple the chunk buffer with the memory subsystem. The chunks may be transferred when the one or more busses are relatively less busy (e.g., when other traffic on the bus is below a threshold). For example, transferring the chunks may be delayed for a time based on current high bus utilization. That is, the chunks may be transmitted non-aggressively when the bus is sufficiently idle. The regular memory requests of the software being executed may be given higher priority for use of the bus than the transfer of the chunks over the bus. This may help to reduce the negative impact on performance associated with implementing the memory race recorder (e.g., reduce the latency of the regular memory accesses by the executing software). In some embodiments, the chunk buffer may have a size ranging from several hundred to several thousand bytes and/or be capable of holding from tens to hundreds of chunks, although this is not required. A larger chunk buffer generally takes more size, has greater manufacturing cost, and consumes more power, while a smaller chunk buffer may fill faster and need to be drained less opportunistically and/or in some embodiments may cause pipeline freezes more frequently.

In some embodiments, the chunk buffer 328 may be coupled with pipeline freeze logic 333 of control logic 336. In some embodiments, for example if the chunk buffer is full or almost full (e.g., the current level meets a fullness threshold), then the chunk buffer may interact with the pipeline freeze logic to temporarily freeze execution of additional instructions (e.g., freeze the execution pipeline 320). This may allow time for chunks to be transferred from the chunk buffer to the memory so that additional capacity in the chunk buffer becomes available. When there is sufficient room in the chunk buffer (e.g., the current level is below a fullness threshold, when room for at least one chunk is available, or otherwise), the chunk buffer may signal this to the pipeline freeze logic so the execution pipeline may resume execution. Alternatively, in another embodiment, chunks may be dropped when the chunk buffer is filled, or the choice between the pipeline freeze and dropping chunks may be configurable (e.g., by a bit in a control register).

In some embodiments, the chunk buffer 328 may be coupled with interrupt logic 334 of control logic 336. The interrupt logic may include logic associated with generating interrupts, handling interrupts, etc. As previously mentioned, in some embodiments chunks may be transferred from the chunk buffer to a dedicated chunk memory corresponding to the monitored thread. The operating system may reserve space for the chunk memories for the different monitored threads, each having potentially a different size. In some cases, the configured memory space of the chunk memory allocated by the operating system may run out. The operating system may keep track of the chunk memory fill level and provides this information to the chunk buffer. The chunk buffer may check if there is enough space in the chunk memory to receive chunks. If there is not enough space, for example if predefined fullness threshold of the chunk memory has been met, the chunk buffer may signal a chunk memory overflow interrupt. As shown, the chunk buffer may be coupled with interrupt logic 334. In response to the chunk memory overflow interrupt, the operating system may take an action. For example, the operating system may flush or otherwise transfer the chunk memory content to a file in on disk, allocate additional space to the chunk memory, or the like.

In some embodiments, the memory race recorder does not need to assume a sequential consistency memory model but rather may observe a total store order (TSO) memory model. In a sequential consistency memory model, load and store operations are not reordered from the way they are ordered in the original program. The original program order of the loads and stores is preserved in the actual/observed execution. In contrast, the TSO memory model may allow loads and stores to be reordered in the actual/observed execution. This may be done to improve performance. For example, in a TSO memory model, even though a load may appear after a store in the original program order, the load may be reordered relative to the store so that the load is actually performed before the store in the actual/observed execution. The ability of the memory race recorder to monitor outstanding writes in the store buffer and indicate such in the chunks helps to allow implementation in such a TSO memory model. In some embodiments, the memory race recorder does not need to assume a directory based cache coherency protocol.

Figure 5:
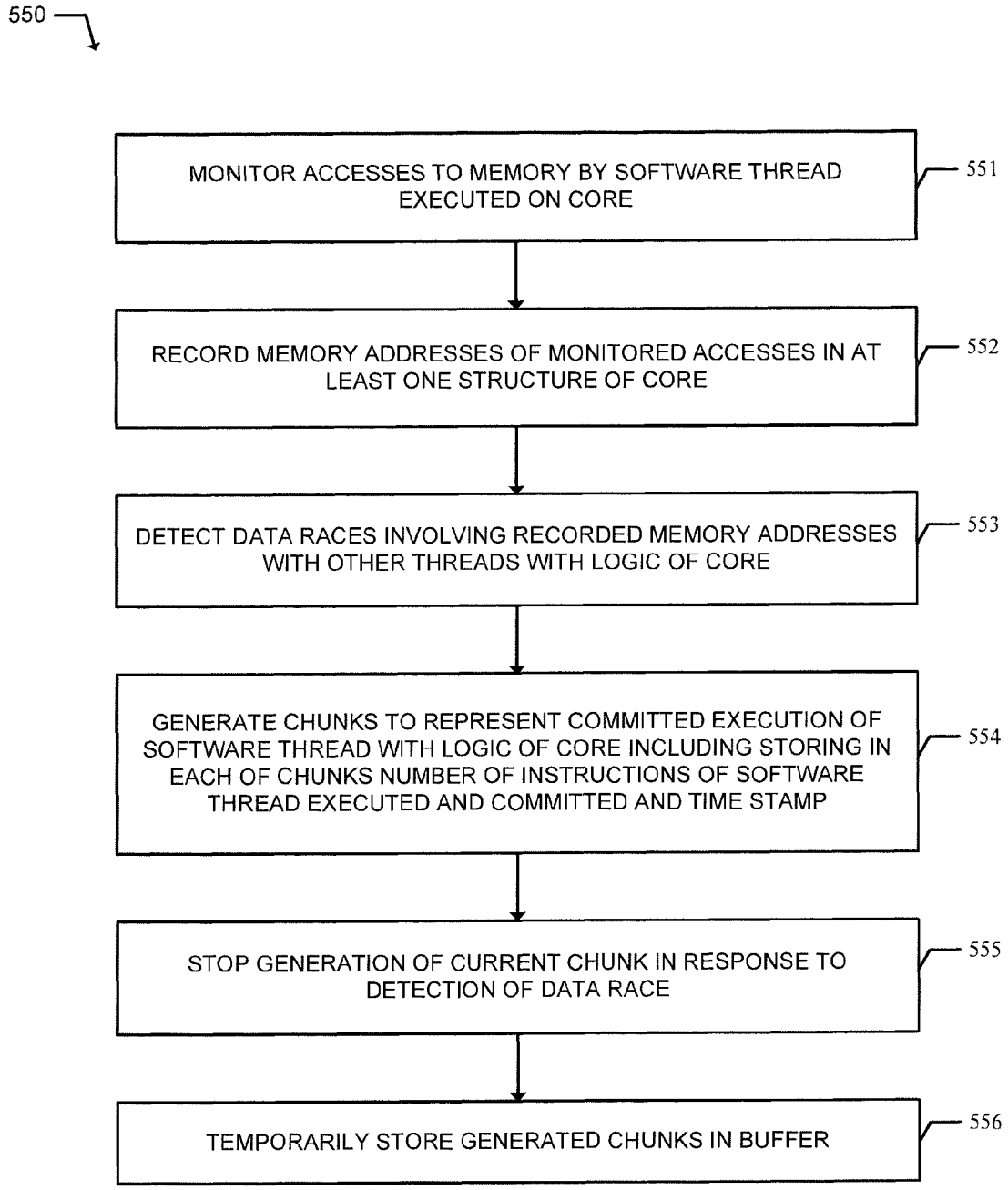
FIG. 5 is a block flow diagram of an embodiment of a method of monitoring memory accesses.

FIG. 5 is a block flow diagram of an embodiment of a method of monitoring memory accesses 550. In some embodiments, the method of FIG. 5 may be performed by the processor of FIG. 1 and/or the processor of FIG. 3. Alternatively, the method may be performed by a similar or different processor. Moreover, the processor of FIG. 1 and/or the processor of FIG. 3 may perform the same, similar, or different methods.

The method includes monitoring accesses to memory by a software thread executed on a core, at block 551. Memory addresses of the monitored accesses are recorded in at least one structure of the core, at block 552. Data races involving the recorded memory addresses with other threads are detected with logic of the core, at block 553. Chunks are generated to represent committed execution of the software thread with logic of the core, at block 554. In some embodiments, this includes storing in each of the chunks a number of instructions of the software thread executed and committed and a time stamp. Generation of a current chunk is stopped in response to detection of a data race, at block 555. The generated chunks are temporarily stored in a buffer, at block 556.

In some embodiments, the chunks and/or their information may be used with other trace information (e.g., real time instruction trace information) to provide additional information about a programs behavior. For instance, the chunk information may complement RTIT information by providing additional knowledge about how the different per thread RTIT packets correlate across threads. For example, the global order of chunks may reveal the cross-thread correlations among the different RTIT packets.

To avoid obscuring the description, relatively simple processors have been shown and described. In other embodiments, the processors may optionally include other well-known components, such as, for example, an instruction fetch unit, an instruction scheduling unit, a branch prediction unit, an instruction decoder, microinstruction queues, an execution unit, microinstruction sequencers, registers, a register renaming unit, instruction and data caches, instruction and data translation lookaside buffers, bus interface units, second or higher level caches, a retirement unit, other components included in processors, and various combinations thereof. There are literally numerous different combinations and configurations of components in processors, and embodiments are not limited to any particular combination or configuration. In some embodiments, the processor may represent a system-on-chip (SoC).

Components, features, and specific optional details described for any one or more of FIGS. 3-4 may also optionally be used in any one or more of FIGS. 1 and 5. The components, features, and specific optional details described herein for an apparatus and chunks optionally apply to the methods described herein which may in embodiments be performed by and/or with such an apparatus and may use the chunks.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690/ may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 706A part of the L1 cache 704, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Processor with Integrated Memory Controller and Graphics

Figure 8:
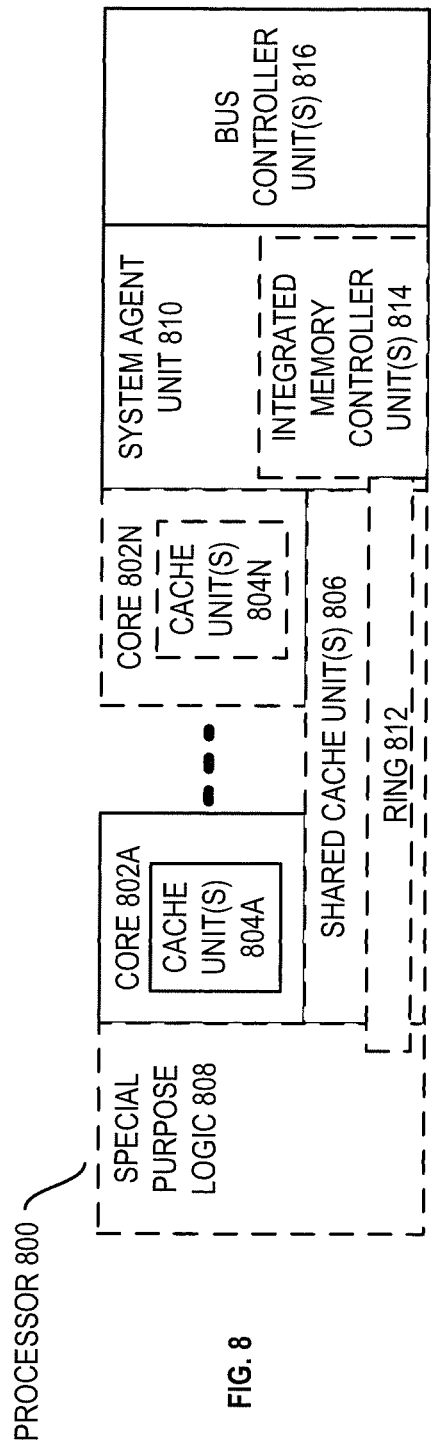
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
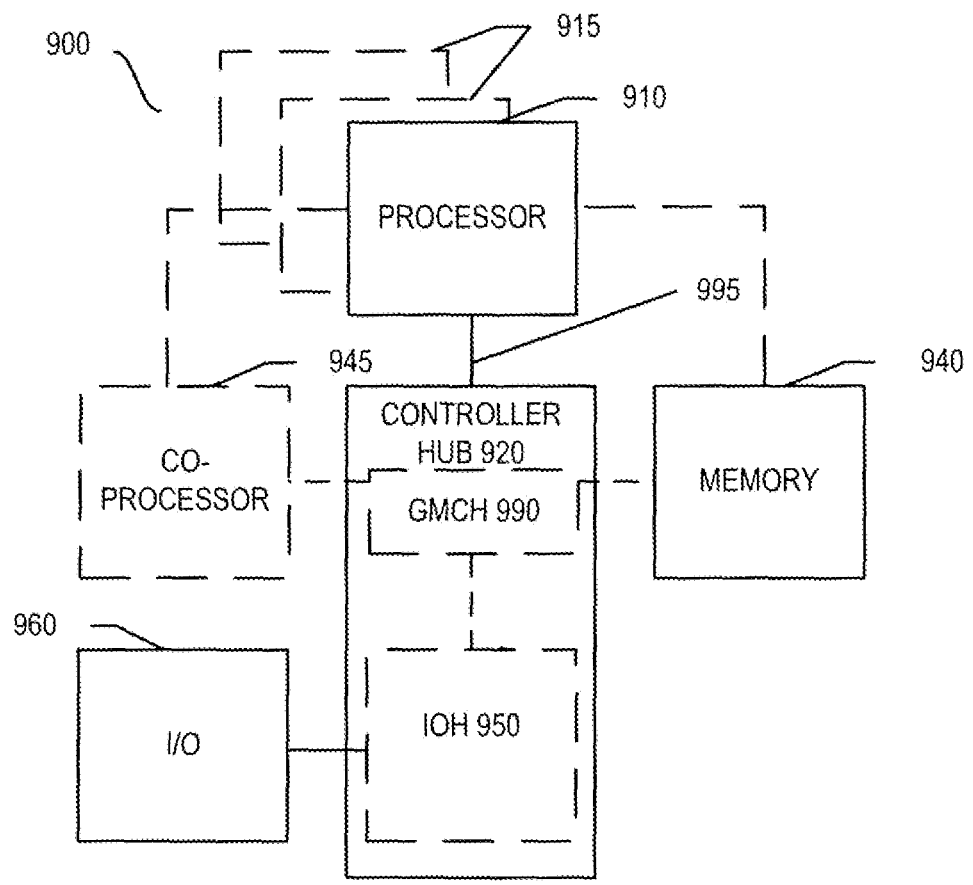
FIG. 9 shown is a block diagram of a system in accordance with one embodiment of the present invention.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
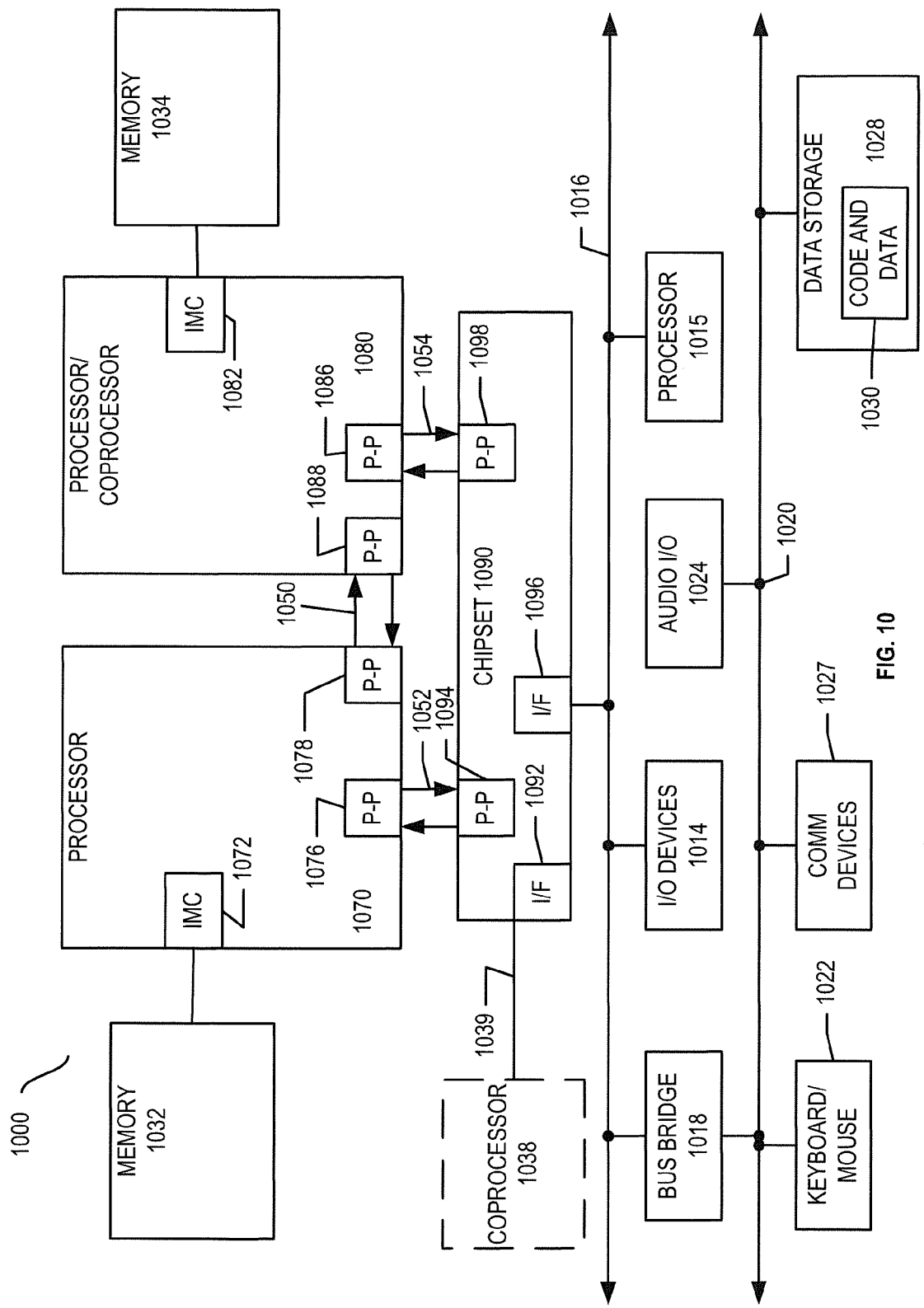
FIG. 10 shown is a block diagram of a first more specific exemplary system in accordance with an embodiment of the present invention.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
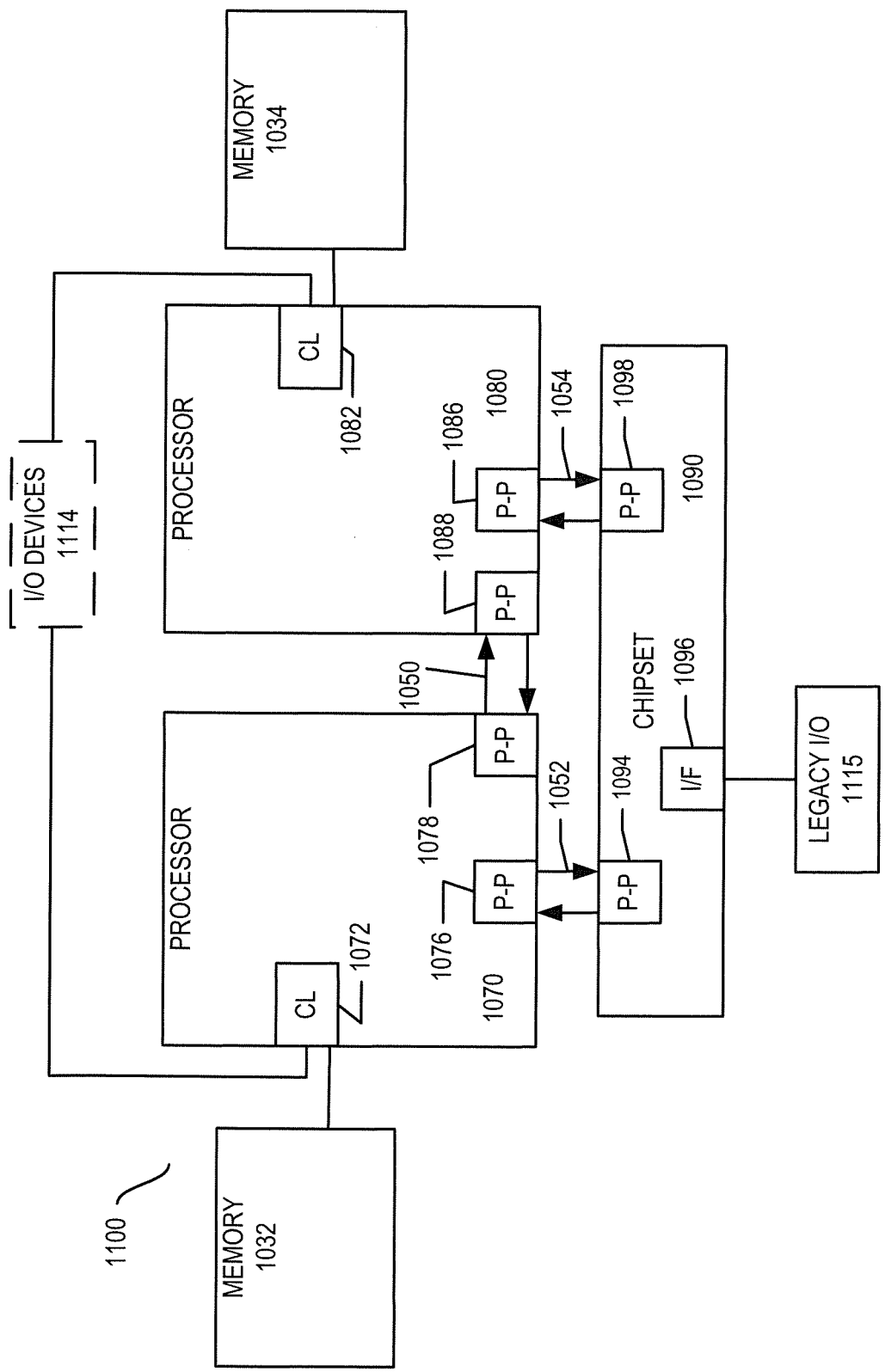
FIG. 11, shown is a block diagram of a second more specific exemplary system in accordance with an embodiment of the present invention.

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
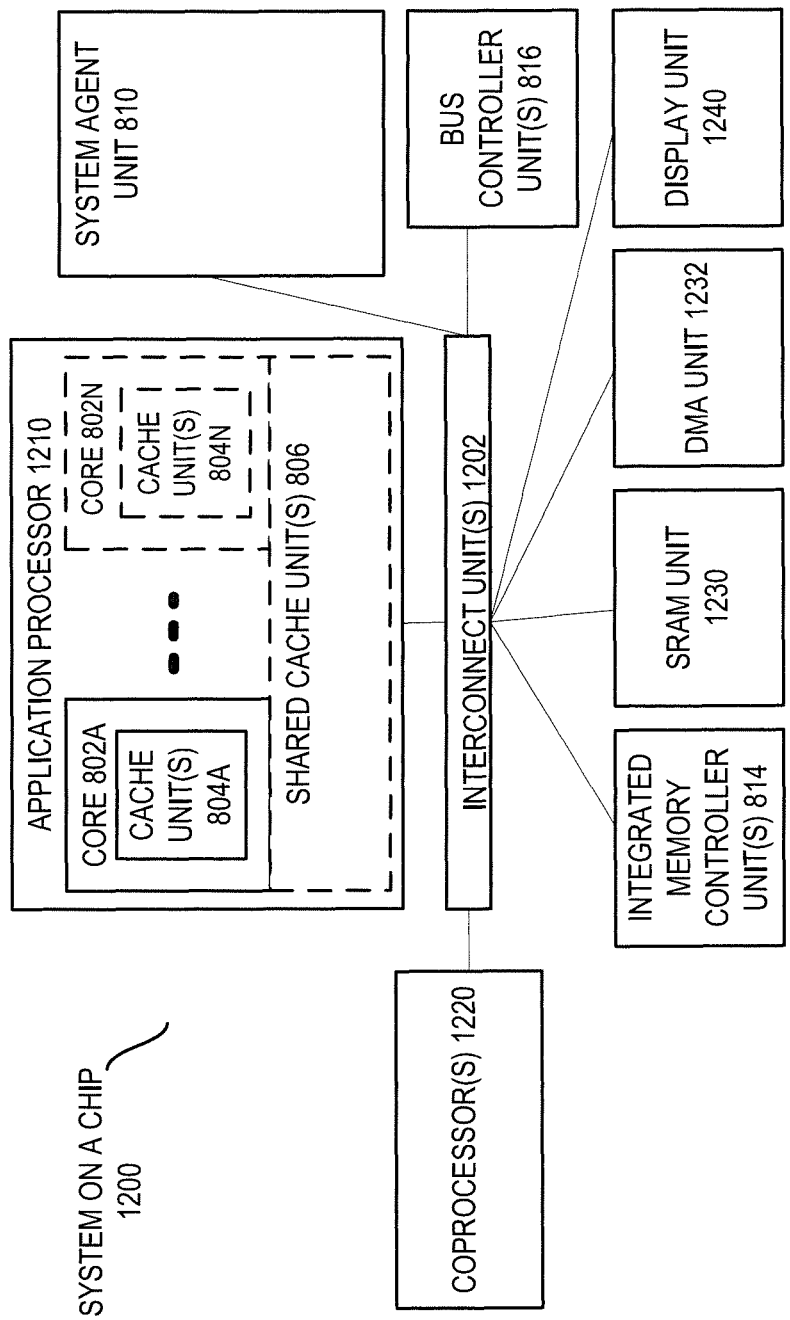
FIG. 12 shown is a block diagram of a SoC in accordance with an embodiment of the present invention.

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 202A-N and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

In the description and claims, the term "logic" may have been used. As used herein, the term logic may include but is not limited to hardware, firmware, software, or a combination thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The term "and/or" may have been used. As used herein, the term "and/or" means one or the other or both (e.g., A and/or B means A or B or both A and B).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. All equivalent relationships to those illustrated in the drawings and described in the specification are encompassed within embodiments of the invention. In other instances, well-known circuits, structures, devices, and operations have been shown in block diagram form or without detail in order to avoid obscuring the understanding of the description.

Where considered appropriate, reference numerals and/or terminal portions of reference numerals have been repeated among the figures to indicate corresponding or analogous elements, which may optionally have similar or the same characteristics unless specified or clearly apparent otherwise. In some cases, where multiple components have been shown and described, they may be incorporated into a single component. In other cases, where a single component has been shown and described, it may be separated into two or more components. In the drawings, lines and arrows represent couplings, and bidirectional arrows represent bidirectional couplings.

Various operations and methods have been described. Some of the methods have been described in a relatively basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
    a first core to execute a first software thread;
    a second core to execute a second software thread; and
    a shared memory access monitoring and recording logic of the first core, the shared memory access monitoring and recording logic comprising:
    a memory access monitor logic to monitor accesses to memory by the first software thread, record memory addresses of the monitored accesses, and detect data races involving the recorded memory addresses with other threads;
    a chunk generation logic coupled with the memory access monitor logic, the chunk generation logic to generate chunks to represent committed execution of the first software thread, each of the chunks to include a number of instructions of the first software thread executed and committed and a time stamp, the chunk generation logic to stop generation of a current chunk in response to detection of a data race by the memory access monitor logic; and
    a chunk buffer coupled with the chunk generation logic, the chunk buffer to temporarily store the chunks until the chunks are transferred out of the processor.

2. The processor of claim 1, further comprising logic coupled with the chunk buffer to transfer the chunks out of the processor over a bus when other traffic on the bus is below a threshold.

3. The processor of claim 1, wherein the first core has an instruction set that includes a multiple memory access instruction that when executed is to perform multiple memory accesses, and wherein the chunk generation logic is to generate a chunk that indicates a subset of the multiple memory accesses that have been performed prior to terminating generation of the chunk.

4. The processor of claim 1, wherein the chunk generation logic is to generate a chunk that indicates a number of outstanding writes in a store buffer at a time of terminating generation of the chunk.

5. The processor of claim 1, wherein the chunk generation logic is coupled with microarchitectural logic of the processor to receive an indication of a microarchitectural event, wherein the chunk generation logic is to include a number in the current chunk based on the microarchitectural event, and wherein the microarchitectural event is selected from: (a) a number of memory accesses of a multiple memory access instruction that have been performed prior to terminating generation of the current chunk; and (b) a number of outstanding writes in a store buffer at a time of termination of generation of the current chunk.

6. The processor of claim 1, wherein the chunk generation logic is coupled with microarchitectural logic of the processor to receive an indication of a microarchitectural event, and wherein the chunk generation logic is to terminate generation of the current chunk based on the microarchitectural event.

7. The processor of claim 1, wherein the chunk buffer is coupled with pipeline freeze logic of the first core, the chunk buffer to signal the pipeline freeze logic to freeze an execution pipeline of the first core when the chunk buffer is one selected from filled to a fullness threshold and full.

8. The processor of claim 1, wherein the first core comprises a total store order memory model that allows a load occurring after a store in program order to be reordered and performed before the store.

9. The processor of claim 1, wherein the first core has a complex instruction set computer (CISC) architecture.

10. The processor of claim 1, wherein the memory access monitor logic is to record the memory addresses with a space-efficient probabilistic data structure that includes hashes of the memory addresses.

11. The processor of claim 1, wherein the memory access monitor logic is to monitor reads and writes to the memory by the first software thread, record memory addresses of the reads in a read set structure and record memory addresses of the writes in a write set structure, and detect the data races involving the recorded memory addresses by comparing addresses of snoops with the memory addresses recorded in the read and write set structures.

12. The processor of claim 1, wherein the chunk generation logic is to generate a chunk that includes a differential time stamp that is relative to a differential time stamp of another chunk.

13. The processor of claim 1, wherein the shared memory access monitoring and recording logic is implemented at least predominantly in hardware logic of the first core.

14. A method comprising:
    monitoring accesses to memory by a software thread executed on a core;

recording memory addresses of the monitored accesses in at least one structure of the core;
detecting data races involving the recorded memory addresses with other threads with logic of the core;
generating chunks to represent committed execution of the software thread with logic of the core including storing in each of the chunks a number of instructions of the software thread executed and committed and a time stamp;
stopping generation of a current chunk in response to detection of a data race; and
temporarily storing the generated chunks in a buffer.

15. The method of claim 14, further comprising transferring the chunks out of the buffer over a bus when a capacity of the bus is not consumed by other traffic.

16. The method of claim 14, further comprising terminating generation of a chunk after only a subset of memory accesses of a multiple memory access instruction have been performed, and wherein generating the chunks includes indicating in a chunk the subset of the memory accesses performed.

17. The method of claim 14, further comprising terminating generation of a chunk, and wherein generating the chunks includes indicating in a chunk a number of outstanding writes in a store buffer when the generation of the chunk was terminated.

18. The method of claim 14, further comprising receiving an indication of a microarchitectural event, and wherein generating the chunks includes indicating a number in a chunk based on the microarchitectural event.

19. The method of claim 14, further comprising receiving an indication of a microarchitectural event, and further comprising terminating generation of a chunk based on the microarchitectural event.

20. The method of claim 14, further comprising freezing an execution pipeline of the core after determining that a fullness of the buffer meets a threshold.

21. The method of claim 14, wherein monitoring the accesses comprises monitoring the accesses in the core having a total store order memory model.

22. The method of claim 14, wherein the monitoring the accesses, the recording the memory addresses, the detecting the data races, the generating the chunks are all performed at least predominantly by hardware logic of the core.

23. A system comprising:
an interconnect;
a processor coupled with the interconnect, the processor including:
a first core to execute a first software thread;
a second core to execute a second software thread; and
a shared memory access monitoring and recording logic of the first core, the shared memory access monitoring and recording logic comprising:
a memory access monitor logic to monitor accesses to memory by the first software thread, record memory addresses of the monitored accesses, and detect data races involving the recorded memory addresses with other threads;
a chunk generation logic coupled with the memory access monitor logic, the chunk generation logic to generate chunks to represent committed execution of the first software thread, each of the chunks to include a number of instructions of the first software thread executed and committed and a time stamp, the chunk generation logic to stop generation of a current chunk in response to detection of a data race by the memory access monitor logic; and
a chunk buffer coupled with the chunk generation logic, the chunk buffer to temporarily store the chunks until the chunks are transferred out of the processor; and
a dynamic random access memory (DRAM) coupled with the interconnect, the DRAM to store the chunks transferred out of the processor.

24. The system of claim 23, wherein the first core has an instruction set that includes a multiple memory access instruction that when executed is to perform multiple memory accesses, and wherein the chunk generation logic is to generate a chunk that indicates a subset of the multiple memory accesses that have been performed prior to terminating generation of the chunk.

25. The system of claim 23, wherein the first core comprises a total store order memory model that allows a load occurring after a store in program order of the first thread to be reordered and performed before the store, wherein the shared memory access monitoring and recording logic is implemented at least predominantly in hardware logic of the first core, and wherein the chunk generation logic is coupled with microarchitectural logic of the processor to receive an indication of a microarchitectural event that is to terminate the generation of the current chunk.

* * * * *